(12) United States Patent
Rouméga

(10) Patent No.: US 10,180,556 B2
(45) Date of Patent: Jan. 15, 2019

(54) PORTABLE VISION ASSISTANCE ASSEMBLY

(71) Applicant: Bénédicte Valerie Rouméga, Cape Town (ZA)

(72) Inventor: Bénédicte Valerie Rouméga, Cape Town (ZA)

(73) Assignee: Bénédicte Valerie Rouméga, Cape Town (ZA)

( * ) Notice: Subject to any disclaimer, the term of this patent is extended or adjusted under 35 U.S.C. 154(b) by 0 days.

(21) Appl. No.: 15/551,653

(22) PCT Filed: Mar. 2, 2016

(86) PCT No.: PCT/IB2016/051169
§ 371 (c)(1),
(2) Date: Aug. 17, 2017

(87) PCT Pub. No.: WO2016/139592
PCT Pub. Date: Sep. 9, 2016

(65) Prior Publication Data
US 2018/0031799 A1 Feb. 1, 2018

(30) Foreign Application Priority Data

Mar. 2, 2016 (ZA) .................. 2015/01380

(51) Int. Cl.
G02B 7/02 (2006.01)
G02C 3/00 (2006.01)
(Continued)

(52) U.S. Cl.
CPC ............. G02B 7/022 (2013.01); G02B 7/04 (2013.01); G02C 3/00 (2013.01); G02C 5/001 (2013.01); G02C 7/081 (2013.01)

(58) Field of Classification Search
CPC .......... G02B 7/022; G02B 7/04; G02C 7/081; G02C 5/001; G02C 3/00
(Continued)

(56) References Cited

U.S. PATENT DOCUMENTS 3,996,947 A * 12/1976 Szpur .................. A45D 40/00
132/316
4,779,829 A * 10/1988 Rocke .................. A47G 29/08
248/206.2
(Continued)

FOREIGN PATENT DOCUMENTS

WO 90/14610 A1 11/1990

Primary Examiner — Tuyen Tra
(74) Attorney, Agent, or Firm — Eckert Seamans Cherin & Mellott, LLC; Philip E. Levy

(57) ABSTRACT

A portable vision assistance assembly (1, 30, 51) is provided comprising a body (3, 35, 55) including a first attachment formation (5, 39, 59) configured to releasably attach the body to a stationary, secondary structure (7), in front of a mirror. The body defines a cavity (9, 47, 57) configured to house a vision correcting optical lens (11, 111, 211, 311). A lid (13, 49, 69) is attached to the body at the entrance of the cavity that is moveable between a closed condition in which it covers the entrance (15) and an open condition in which the lid extends away from the entrance to provide access to the cavity. When the lid extends away from the entrance it positions a second attachment formation (17, 65) provided on the lid for the attachment of a vision correcting optical lens in front of a mirror.

18 Claims, 5 Drawing Sheets

(51) Int. Cl.
 *G02C 5/00* (2006.01)
 *G02C 7/08* (2006.01)
 *G02B 7/04* (2006.01)
(58) Field of Classification Search
 USPC .................................................. 359/642, 798
 See application file for complete search history.

(56) References Cited

U.S. PATENT DOCUMENTS

| | | | | |
|---|---|---|---|---|
| 5,261,582 A | * | 10/1993 | Mathews | A45C 11/04 224/240 |
| 6,406,144 B1 | | 6/2002 | Waters | |
| 2009/0251662 A1 | | 10/2009 | Rymniak | |

* cited by examiner

PORTABLE VISION ASSISTANCE ASSEMBLY

CROSS-REFERENCE TO PRIOR APPLICATIONS

This application claims the priority benefit under 35 U.S.C. § 371 of International Patent Application No. PCT/IB2016/051169, filed on Mar. 2, 2016, which claims the priority benefit from South African Provisional Application No. 2015/01380, filed on Mar. 2, 2015, the contents of which are herein incorporated by reference.

FIELD OF THE INVENTION

This invention relates to a portable vision assistance assembly for a visually impaired person. More particularly the invention relates to improvements to a vision assistance assembly for visually impaired persons for use at times when it is not practical to wear other vision aids, such as while applying makeup, contact lenses, medicinal products or doing facial grooming in front of a mirror.

BACKGROUND TO THE INVENTION

It is common for people, more specifically women, who wear vision correcting lenses due to impaired vision, to find the process of applying cosmetics, contact lenses, medicinal products or performing facial grooming in front of the mirror difficult, mainly because the spectacles are an obstruction or the frame of the spectacles impedes at least a part of the wearer's field of vision. This is especially problematic when applying contact lenses, makeup or grooming around the eyes and eyebrows. In general, people suffering from hypermetropia or farsightedness experience the most difficulty.

The applicant's South African patent number 2013/06201 entitled "Vision Assistance Assembly" discloses a vision correcting optical lens that is mounted on a supporting arm and base attached to a mirror or a secondary structure proximate the mirror. The assembly allows a visually impaired user to have their vision corrected by looking through the optical lens into the mirror to see themselves, while having their faces unobscured and both hands free to apply contact lenses, medicinal products, cosmetics or do facial grooming. This type of vision assistance assembly lends itself more towards being permanently installed or placed in front of a mirror, which may be unsightly. Moreover, the assembly may prove difficult to transport in, for example, a handbag or the like. There is thus a need for a more versatile vision assistance assembly.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention, there is provided a portable vision assistance assembly comprising a body including a first attachment formation configured to releasably attach the body to a stationary, secondary structure, in front of a mirror, the body defining a cavity configured to house a vision correcting optical lens, the cavity having a lid that is moveable between a closed condition in which it covers an entrance to the cavity and an open condition in which the lid extends away from the entrance to provide access to the cavity and to position a second attachment formation provided on the lid for the attachment of a vision correcting optical lens to the second attachment formation.

A further feature provides for the body to include a base, the base having a generally flat bottom surface on which the first attachment is provided for enabling the assembly to stand proud from a flat surface of a secondary structure.

Yet further features provide for the first attachment formation to be an adhesive tape configured to releasably attach to flat surfaces; for the adhesive tape to include a dense array of micro fabricated synthetic setae; and for the adhesive tape to preferably be biomimetic gecko tape.

Still a further feature provides for the body defining the cavity to be elongate and the base to be located at a first end of the body and the lid on an opposite end of the body relative to the base.

Further features provide for the lid to be hingedly connected to the body at or near the entrance to the cavity; for the vision correcting optical lens to include an attachment formation complementary to the second attachment formation on the lid, the complementary attachment formation being arranged to permit attachment of the vision correcting optical lens to the lid when the lid is in an open condition in which it extends at an angle from the entrance of the cavity; and for the lid to be hingedly connected to an operatively lower side of the body, at the entrance, so that the lid is operatively downward depending when in the open condition, thereby permitting the vision correcting to be attached to the lid such that it is located operatively below the lid when it is in the open condition.

Still a further feature provides for the cavity to include a cradle, operable to move the vision correcting optical lens when it is in in the cavity between end positions within the cavity upon actuation of the lid, wherein in the a first end position the vision correcting optical lens is wholly received and enclosed within the cavity while the lid is closed and in a second end position the vision correcting optical lens extends an least partially outside of the entrance of the cavity towards the exterior while the lid is open.

A further feature provides for the base to be pivotally connected to the body so as to pivot about the first end of the body.

In one embodiment, the base consists of a detachable plate on which the first attachment formation is provided, the plate being detachable from the base so that it can be attached to a flat surface of a secondary structure, and a base member pivotally connected to the body, the plate and base member having complementary engagement formations for securing the base member and thus the body to the plate.

A further feature provides for the detachable plate to include supporting formations, preferably one or more projections, on which the base member rests and which are arranged to support the base member and the body connected thereto, thereby holding the body in a generally horizontal position when the base is attached to a vertical surface of a secondary structure.

Yet a further feature provides for the body to be adjustable relative to the base, preferably telescopically.

Still a further feature provides for the assembly to further include a light source arranged to shine light in a direction away from the vision correcting optical lens when the lens is mounted to the lid.

A further feature provides for the vision correcting optical lens to be a variable focus optical lens with adjustment means for varying the focal length of the lens.

Further features provide for the variable focus optical lens to comprise a first optical lens superimposed by a second optical lens to provide at least two optical centres and for the adjustment means to continually adjust the relative positions of the optical centres.

Yet further features provide for at least one of the lenses to be slideably movable relative to the other such that adjustment of the relative position of the first and/or second optical lens, changes the combined focal length of the variable focus optical lens in a continuous manner.

Still further features provide for the adjustment means to comprise a controller and actuating means; for the controller to comprise a dial or a slider; and for the actuating means to comprise adjustable connectors between the two lenses or between the lenses and a frame that are configured to move at least one optical lens relative to the other lens.

In one embodiment, the variable focus optical lens comprises two lenses held captive in a frame to form a chamber between the two lenses.

Further features provide for the chamber to be at least partially filled with an optically clear fluid; for at least one of the surfaces of a lens that is in contact with the fluid to be flexible or for the chamber to contain at least one flexible membrane; for the adjustments means to control the flow of liquid between an external bladder and the chamber to increase or decrease the fluid volume in the chamber, thereby controlling the shape of the flexible surface or membrane to vary the focal length of the lens.

In one embodiment, a fixed volume of optically clear fluid is contained within the chamber and the adjustment means is configured to mechanically alter the shape of the flexible surface or membrane enclosing the fixed volume of fluid.

Further features provide for the optical lenses to be manufactured from polycarbonate, glass, plastic, Trivex or high-index plastics; and for the body to be manufactured from a transparent material.

Still further features provide for the light source to be powered from a battery unit incorporated in the assembly, alternatively from an external power source by way of an electrical cord and connector.

Still further features allow for the portable vision assistance assembly to include a mirror; and for the mirror to be secured to the base, behind the lens.

An embodiment of the invention will now be described, by way of example only, with reference to the accompanying drawings.

DETAILED DESCRIPTION WITH REFERENCE TO THE DRAWINGS

Figure 1:
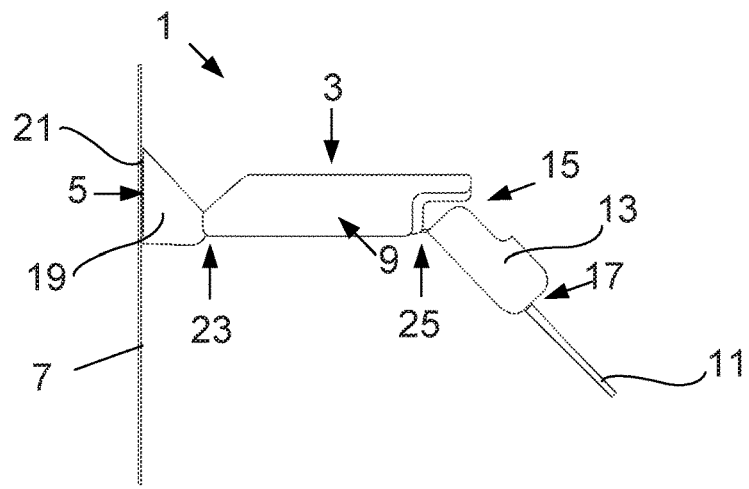
FIG. 1 is a side view of an embodiment of a portable vision assistance assembly in accordance with the invention.
Figure 2:
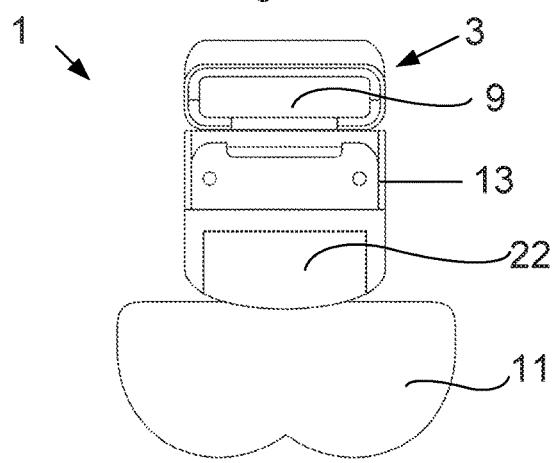
FIG. 2 is a front view of the embodiment of FIG. 1.
Figure 3:
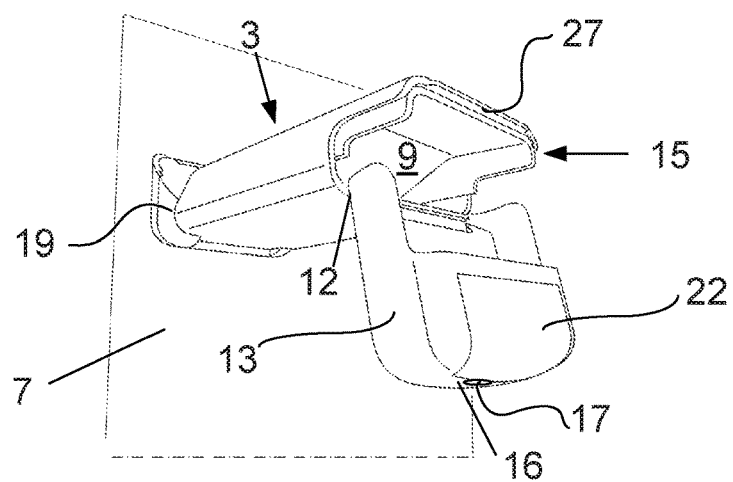
FIG. 3 is a three-dimensional view of the embodiment of FIG. 1 without the vision correcting optical lens.

An embodiment of a portable vision assistance assembly (1) is shown in FIGS. 1 to 3 and includes a body (3) having a first attachment formation (5) configured to releasably attach the body (3) to a stationary, secondary structure (7), in front of a mirror. The body (3) defines a cavity (9), most clearly shown in FIGS. 2 and 3, in which a vision correcting optical lens (11) can be housed. The body (3) includes a lid (13) at an entrance (15) to the cavity (9) that is moveable between a closed condition in which it covers the entrance (15) to the cavity (9) and an open condition in which the lid (13) extends away from the entrance (15) to provide access to the cavity (9) and to expose or suitably position a second attachment formation (17) provided on the lid (13) for the attachment of a vision correcting optical lens (11) to the second attachment formation (17).

The first attachment formation (5) is provided on a base (19) of the body (3) and is configured to releasably attach the body (3) to any flat, stable and stationary, secondary structure (7), in front of a mirror. Typically, this surface will be the mirror itself, but may be another suitable surface in close relation to the mirror, such as a wall, shelf, vanity, dresser, or the like.

The base (19) has a generally flat bottom surface (21) on which the first attachment formation (5) is provided for enabling the assembly (1) to stand proud from a flat surface of a secondary structure (7). The first attachment formation (5) is an adhesive tape configured to releasably attach to flat surfaces. The adhesive tape includes a dense array of micro fabricated synthetic setae, and is preferably gecko tape. Gecko tape is a reusable tape that mimics the adhesion of millions of microscopic hair-like projections known as setae on Gecko feet using silicones, plastics, carbon nanotubes or other materials.

The body (3) is elongate and the base (19) is located at a first end (23) of the body and the lid on an opposite free end (25) of the body (3) relative to the base (19). The body (3) defines an elongate hollow cavity (9) which is configured to house or contain the vision correcting optical lens (3) when it is not in use. The cavity (9) is shaped and sized such that the optical lens (3) is housed lengthwise within the cavity. The body (3) not only defines a cavity for the optical lens but also functions as a support arm that extends from the base (19) and which therefore is used to support the vision correcting optical lens (11) at a selected distance from a secondary structure such as a mirror.

The cavity (9) is provided with a lid (13) that is hingedly connected to the body (3) at or near the entrance (15) to the cavity (9) at the free end (25) of the body (3). The lid (13)

is hingedly moveable between a closed condition in which it covers the entrance (15) to the cavity (9) and an open condition in which it extends at an angle from the entrance (15) of the cavity (9), preferably at a right angle. The lid (13) is hingedly connected to an edge of an operatively lower surface (12) of the body (3) at the entrance (15) so that the lid (13) is downward depending when in the open condition, as shown in FIG. 3. This permits the vision correcting optical lens (11) to be attached to the lid such that it is located operatively below the lid (13) when the lid is in the open condition.

The lid (13) and body (3) include complementary formations (27) that provide, for example, a snap fit of the lid (13) to the body to maintain it in the closed condition. The lid (13) is manually opened by applying pressure to the lid and pivoting it to the open condition.

The optical lens (11) must be attached to the lid (13) so that it is in an orientation in which the vision correcting optical lens can be pivoted about the hinge to a position in which the lens (11) is substantially parallel to the mirror. The second attachment formation (17) is configured to receive and hold the vision correcting optical lens (3) so that it projects from the lid and is generally aligned with the lid (19).

The second attachment formation (17) is in the form of an aperture, most clearly shown in FIG. 3. The second attachment formation (17) is provided on the lid (13) on the outer surface of an operatively lower end (16) of the lid when the lid is in an open condition. The vision correcting optical lens (11) can be releasably attached to the second attachment formation (17) on the lid (13) at or near the free end (25) of the body (3). The length of the body (3) may be chosen to correspond with a suitable distance that the vision correcting optical lens (11) should be spaced from a stationary secondary structure (7) such as a mirror to which the body is mounted. The length of the body (3) may vary between 8 cm and 30 cm for example, or may be at least 8 cm initially and be adjustable to a longer length, preferably telescopically.

Figure 9:
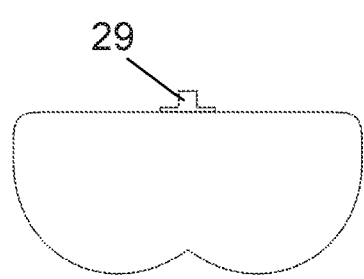
FIG. 9 is a vision correcting optical lens.
Figure 10:
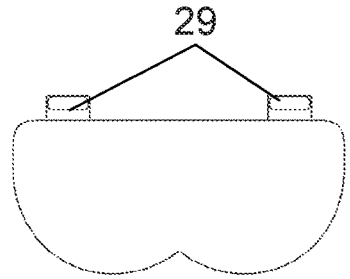
FIG. 10 is a second embodiment of a vision correcting optical lens.

Embodiments of vision correcting optical lenses are shown in FIGS. 9 and 10. The lenses include one or more attachment formations (29) that are complementary to one or more second attachment formations on the lid of the body. The complementary attachment formations (29) are arranged to permit attachment of the vision correcting optical lens to the lid so that it projects away from the lid. When the lid is in an open condition, the lid and the lens extend at an angle from the entrance of the cavity.

In a preferred embodiment the cavity includes a cradle (not shown), operable to move the vision correcting optical lens in the cavity between end positions upon actuation of the lid. The lens may therefore move with the cradle between a first end position in which the vision correcting optical lens is received or completely contained within the cavity while the lid is closed and in a second end position in which the vision correcting optical lens at least partially protrudes from the entrance to the cavity towards the exterior when the lid is open.

A light source (22) is provided on the lid (13) and when the lid is in the open condition, the light is suitably positioned to shine light in a direction away from the vision correcting optical lens (11) when it is mounted to the lid and towards the face of a user. The light source (22) is therefore arranged to illuminate the face of a user while the user's face is opposite the vision correcting optical lens (11). This feature is particularly useful when a user intends to apply make-up or do other types of facial grooming. The portable vision assistance assembly includes a battery unit to power the light source. Alternatively, the light source can be powered through an electrical cord and connector that may be connected to an external electricity source. It should be appreciated that the light source (22) may be configured to automatically activate (switch on) when the lid is opened and deactivate when the lid is closed. Alternatively the light source (22) may be provided with a manual switch to selectively activate or deactivate it.

In the embodiment shown in FIGS. 1 to 3, the base (19) is pivotally connected to the body (3) so as to pivot about a first end (23) of the body. The pivotable connection is configured to allow the base (19) to pivot about the end (23) by approximately 90° such that the body (3) extends generally at right angle from the flat surface (21) of the base (19) when secured to a secondary structure (7) in use. This allows the assembly (1) to stand proud from a flat surface of a secondary structure (7). Alternatively, a stop formation arranged to abut against the base (19) is provided to ensure that the base (19) pivots by a maximum of approximately 90° about the end (23) of the body (3).

Figure 4:
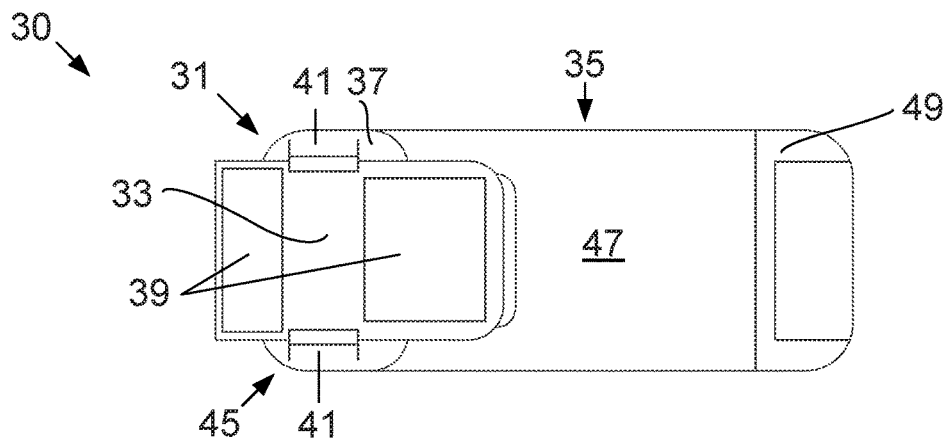
FIG. 4 is a top view of a second embodiment of a portable vision assistance assembly in an inoperative condition in which the vision correcting optical lens is contained within a cavity defined in the body.

In an embodiment shown in FIG. 4, the base (31) comprises two separate parts, a detachable plate (33) defining a flat surface on which the first attachment formation (39) is provided and a base member (37) that is pivotally connected to the body (35). The plate (33) is detachable from the base (31) or body (35) so that it can first be attached to a flat surface (15) of a secondary structure. The detachable plate (33) and the base member (37) have complementary engagement formations (41) for securing the base member (37) and thus the body (35) to the plate (33).

The portable vision assistance assembly is convertible between an operative condition in which it is configured to be attached to a secondary structure and an inoperative condition in which it is configured to be stored or transported.

An embodiment of a portable vision assistance assembly (30) is shown in an inoperative condition in FIG. 4. In this condition the vision correcting optical lens is contained or housed within the cavity (47) defined by the body (35) and the lid (49) of the cavity (47) is closed. The pivotable base member (37) is coaxially aligned with the body (35), i.e. not pivoted about the end (45), and releasably retained in the aligned position with retaining means such as clips or a snap fit. In addition, the plate (33) is attached to the body so as to rest on top of it in an orientation in which the plate (33) is substantially parallel with the elongate body (35). The plate (33) may also be turned upside down such that the surface with the first attachment formation (39) faces towards the body (35). The first attachment formation (39) would then be covered thereby protecting it or keeping it relatively clean, as may be required during storage or transport of the assembly.

In an operative condition, the base member (37) is pivoted about the end (45) of the body (35) by approximately 90° such that both the base member (37) and plate (33) are at right angles relative to the body (35). Thus in the operative condition, the flat surface of the plate (33) is in a plane perpendicular to the longitudinal axis of the body (35) so that the first attachment formation (39) can be attached to a secondary structure with the body (35) standing proud of the secondary structure.

Figure 5:
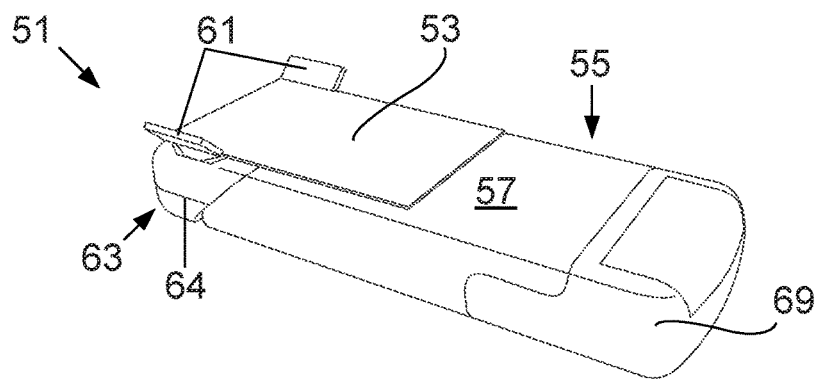
FIG. 5 is a three-dimensional view of a third embodiment of a portable vision assistance assembly in an inoperative condition.
Figure 6:
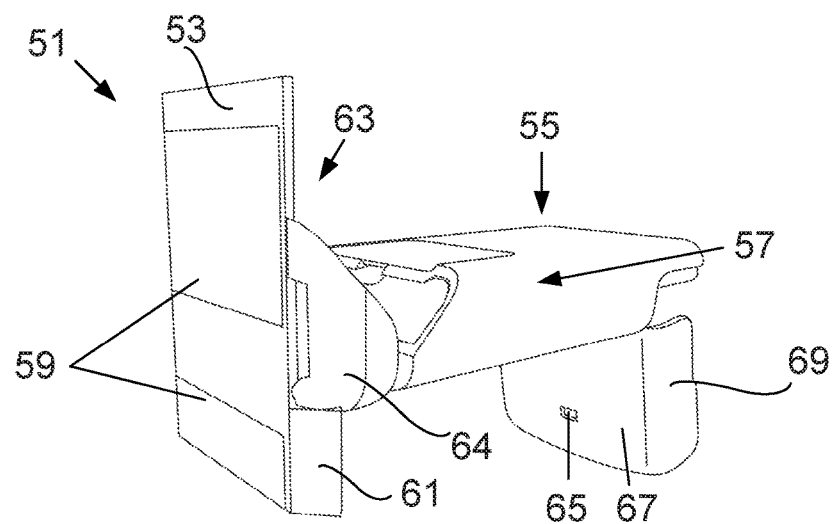
FIG. 6 is a three-dimensional view of the embodiment of FIG. 5 in an operative condition.
Figure 7:
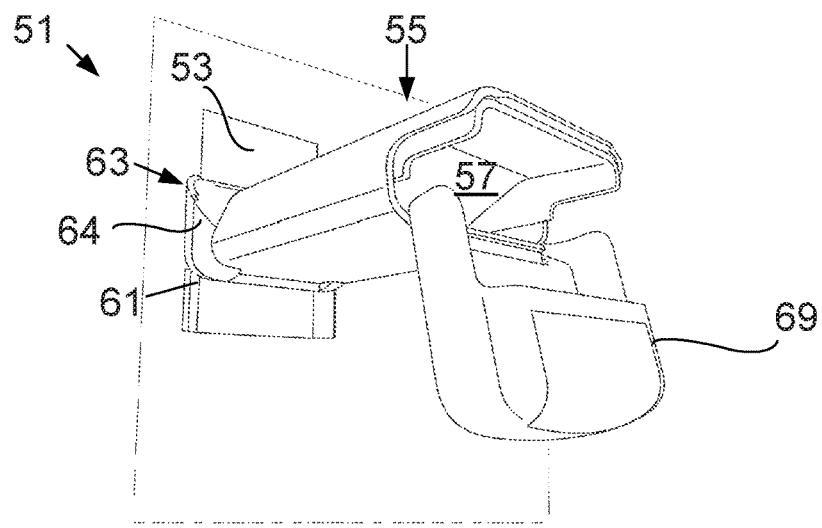
FIG. 7 is a three-dimensional view of the embodiment of FIG. 5 secured to a secondary structure.
Figure 8:
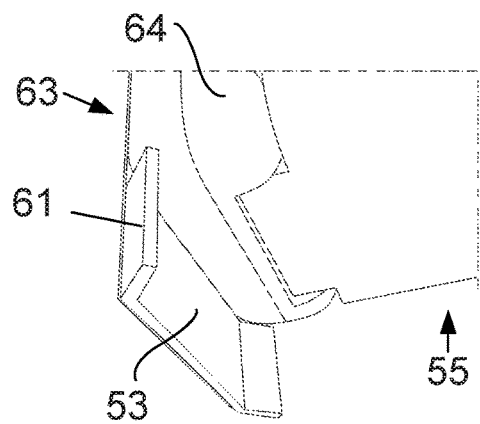
FIG. 8 is a bottom perspective view of the embodiment of FIG. 5.

A further embodiment of a portable vision assistance assembly (51) is shown in an inoperative condition in FIG. 5 and in an operative condition in FIGS. 6 to 8. This embodiment also includes a detachable plate (53) and a pivotable base member (64) forming part of the base (63). In FIG. 5, the plate (53) is attached to the body (55) in an orientation in which the first attachment formation (59) is covered. The detachable plate (53) can either be clipped onto the outer surface of the body (55) or slideably interacts therewith with the first attachment formation facing (59) toward the body (55).

The detachable plate (53) of the base (63) includes supporting formations (61) in the form of projections on which the body (55) rests when the assembly is in an operative condition as shown in FIGS. 6 to 8. The supporting formations (61) are arranged to hold the body (55) generally horizontal while the plate (53) is attached to a vertical surface such as on the surface of a mirror.

In FIGS. 6 to 8 the vision correcting optical lens forming part of the assembly is not shown, but the second attachment formation (65) for the optical lens is shown in FIG. 6. In FIG. 6, the second attachment formation (65) is located on an outer surface of an operatively rearward facing side (67) of the lid (69) located at the entrance of the cavity (57). The second attachment formation (65), in this embodiment an aperture, is complementary to an attachment formation on the optical lens (not shown), which, in this embodiment, is a clip sized and shaped to extend through the aperture. The attachment formation of the optical lens is further configured to ensure that the optical lens extends operatively downward from the lid (69) when the lid (69) is in the open condition and that the optical lens is located a sufficient distance below the lid so as to be clear of the lid to allow an unobstructed view through the optical lens. The attachment formation of the optical lens may therefore be an elongate clip or a clip provided with an elongate arm that connects the clip to the optical lens.

In further embodiments, the vision correcting optical lens is a variable focus optical lens with adjustment means for varying the focal length of the lens.

Figure 11:
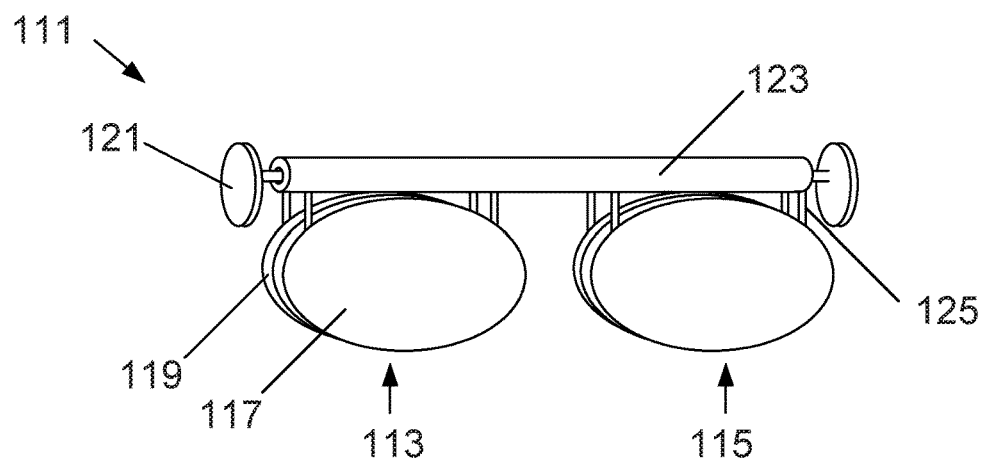
FIG. 11 is a representation of a first embodiment of a variable focus optical lens with adjustment means.

FIG. 11 is a representation of a first embodiment of a variable focus optical lens (111) with adjustment means. In this embodiment, a pair of superimposed lenses is provided for each eye of a user similar to the configuration of conventional eyeglasses. The variable focus optical lens (111) has two lens assemblies (113, 115), each comprising a first optical lens (117) superimposed by a second optical lens (119) to provide at least two optical centres per lens assembly. The first and second optical lenses (117, 119) are slideably movable relative to one another such that adjustment of the relative positions the optical lenses (117, 119), changes the combined focal length of the variable focus optical lens in a continuous manner. In this embodiment the two superimposed lenses (117, 119) are laterally slideable. Two controllers, in this embodiment, manually operable dials (121) are provided on opposite ends of a frame (123), which are used to continually adjust the relative positions of the optical lenses and, therefore, the combined focal length of the lens (111). Actuating means, in this embodiment, adjustable connectors (125) are provided between one or both of the lenses and the frame that are configured to move at least one optical lens relative to the other lens. In other embodiments, the adjustable connectors (125) can also be located between the first and second optical lenses (117, 119), provided that they are connected to or in communication with a manually operable controller.

Figure 12:
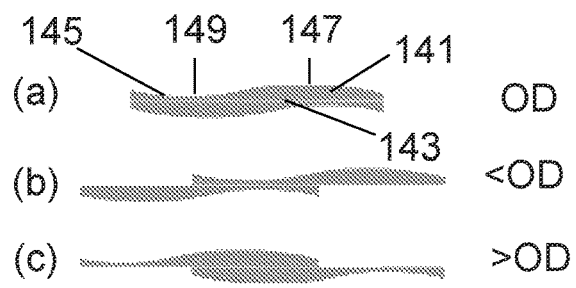
FIG. 12 is a two-dimensional representation of lens arrangements of the lens of FIG. 11, viewed from the top.

FIG. 12 is a two-dimensional representation of arrangements of a lens assembly similar to that of FIG. 11 viewed from the top. In its simplest embodiment, each optical lens (141) has a first planar surface (143) and a second non-planar surface (145) comprising a concave portion (147) and a convex portion (149) approximating a lens of either positive or negative power. The arrangements shown in FIG. 12 produce a lens assembly with: (a) zero spherical power; (b) negative spherical power and (c) positive spherical power. When two identical lenses are superimposed such that the concave and convex portions overlap, as shown in (a), the net result is a curved plate of uniform thickness. This arrangement produces uniform optical path length and behaves like a lens assembly of zero power. The power of the lens assembly can be changed by changing the extent to which the concave and convex portions overlap. Positive power is obtained by progressively overlapping the convex portions, as shown in (b). Negative power is obtained by progressively overlapping the concave portions of each lens, as shown in (c). The continual adjustment of the relative positions of the lenses by gliding of the lenses across one another varies the power, i.e. the focal length of the lens assembly. The gliding of the lenses should be with high precision, repeatability and ease and the mechanical actuation mechanism must therefore permit unobtrusive movement.

In one embodiment of the invention, the superimposed lenses are spaced apart by approximately 2 cm and the relative positions of the lenses are adjusted by changing the spacing between the lenses or their angular orientation relative to one another in order to vary the focal length of the variable focus optical lens.

Figure 13:
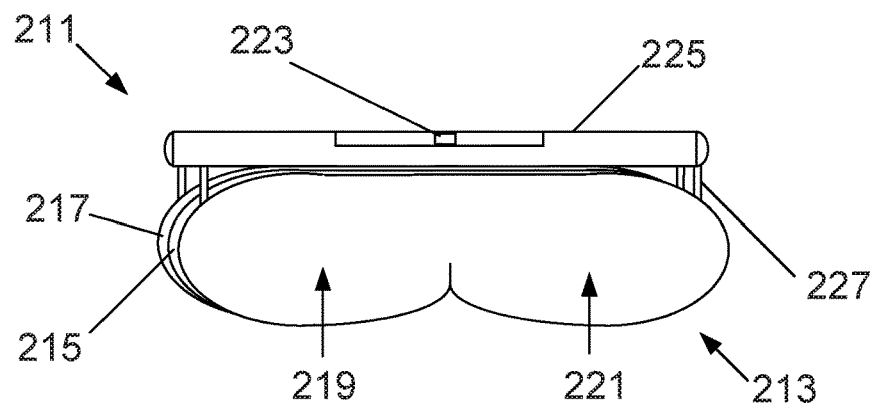
FIG. 13 is a representation of a second embodiment of a variable focus optical lens with adjustment means.

FIG. 13 is a representation of a second embodiment of a variable focus optical lens (211) with adjustment means. In this embodiment, a single lens assembly (213) comprising a first lens (215) superimposed by a second lens (217) is provided. The surface profile of the outer surfaces of the lenses vary across a first surface area (219) of the lens (213) and a second surface area (221) of the lens (213) substantially as described above with reference to FIG. 12. The first and second lenses (215, 217) are slideably movable relative to one another such that adjustment of the relative positions of the optical lenses, changes the combined focal length of the variable focus optical lens in a continuous manner. In this embodiment the controller is a slider (223) provided on a frame (225) that is used to continually adjust the relative positions of the optical lenses. Adjustable connectors (227) between one or both of the lenses and the frame actuate the gliding movement of the at least one lens relative to the other.

Figure 14:
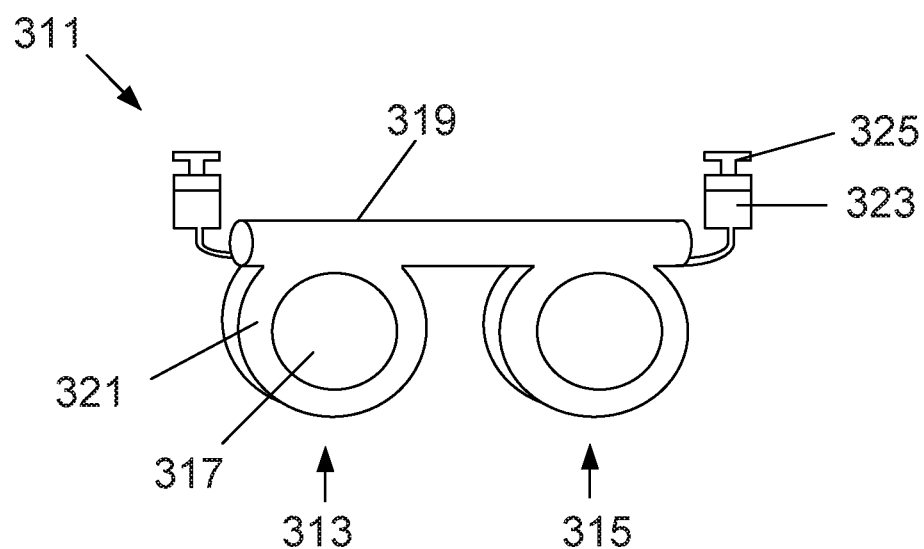
FIG. 14 is a representation of a third embodiment of a variable focus optical lens with adjustment means.

FIG. 14 is a representation of a third embodiment of a variable focus optical lens (311) comprising two lens assemblies (313, 315), each with a first circular optical lens (317) superimposed by a second circular optical lens to provide at least two optical centres per lens assembly. In this embodiment, the lenses are spaced apart. The optical lenses are held captive in a frame (319) that surrounds the lenses to form a chamber (321) between the two lenses. The chamber (321) is at least partially filled with an optically clear fluid, such as silicon oil or the like. One of the lens surfaces that is in contact with the fluid is a flexible surface that can change shape, by for instance bowing inward or outward depending on the volume of fluid in the chamber (321). It will be appreciated that either one or both of the lenses may have a flexible surface that is in contact with the fluid in the chamber and is configured to change shape in accordance with a change of fluid volume in the chamber. Alternatively, one or two flexible membranes are provided within the chamber that have surfaces in contact of the optically clear fluid. The lenses of this embodiment of the invention are constrained to a circular shape because the perimeter of the flexible membrane must be fixed to a structure of the frame (319).

In the embodiment shown in FIG. 14, one external bladder (323) at least partially filled with optically clear fluid is provided per lens assembly. In an embodiment of the lens in which the chambers of the lens assemblies are in communication, only one external bladder is necessary to continually vary the focal length of both lens assemblies. Such an embodiment will be suitable for use by a person requiring the same amount of optical correction for both of their eyes. The external bladder (323) is in communication with the chamber (321) and has adjustments means, in this embodiment a manually operable piston (325), to control the flow of liquid between the external bladder and the chamber to either increase or decrease the fluid volume in the chamber. The change in fluid volume, alters the shape of the flexible surface and thus the focal length of the variable focus optical lens.

In one embodiment, the volume of optically clear fluid in the chamber is fixed. In such an embodiment, the shape of the flexible membrane enclosing a fixed volume of fluid is mechanically adjusted by actuators and controllers to continually vary the focal length of the variable focus optical lens. The membrane may be in the form of a fluid-filled bag with flexible walls attached to a rigid transparent base. The curved membrane assumes a perfect spherical profile. Actuation points such as pivot points are provided on a boundary of the rigid base that is used to affect a change in lens power.

Figure 15:
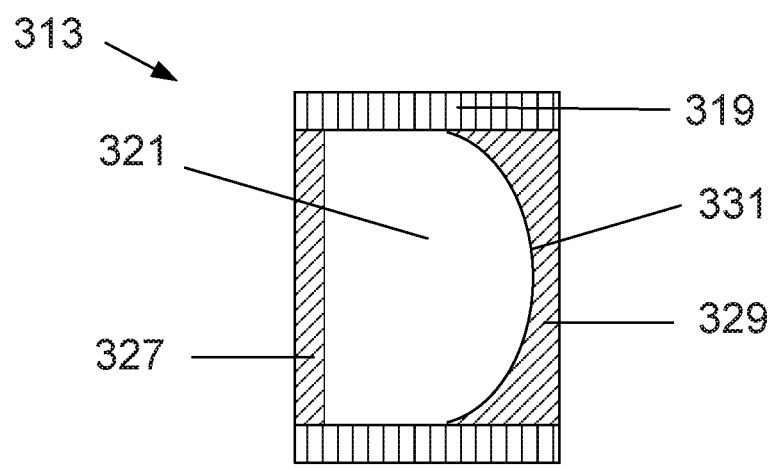
FIG. 15 is a cross-sectional representation of the lens assembly of FIG. 14.

FIG. 15 is a cross-sectional representation of a lens assembly of FIG. 14 with a chamber (321) housing an optically clear liquid between two lenses and the frame (319). A first rigid optical lens (327) is superimposed by a second optical lens (329) with a flexible surface (331) that can change shape depending on the volume of fluid in the chamber (321).

Many of the above described embodiments of a variable focus optical lens are similar to adjustable eyewear that are commercially available, such as Adlens® variable focus eyewear, Superfocus® and Eyejusters®. It will be appreciated that the variable focus optical lens of the portable vision assistance assembly may also comprise modified or unmodified commercially available adjustable eyewear mounted on a body that is configured to support the eyewear from a stationary, secondary structure, in front of a mirror, and having a cavity in which the adjustable eyeware may be stored and/or transported.

Other types of variable focus optical lenses exist. These include lenses that incorporate electro-active lenses or electro-wetting lens devices. Electro-active lenses include liquid crystals that change their refractive index when an electric field is applied across them. An electro-wetting lens device comprises a closed cell with a wall made of conductive material. Two immiscible liquids with different refractive indices are sandwiched between optically clear plates, such as glass plates. One of the liquids is an electricity conducting water solution and the other is a non-polar oil that does not conduct electricity. The interface between the liquids forms a refractive surface. The shape of the refractive surface can be controlled by changing the relative wettability of the two liquids though the application of an electric current.

The adjustment means of the variable focus optical lens may also be configured to allow adjustment of the focal length and thus the power or strength of the lens in a continuous or a stepwise manner in accordance with common prescriptions in strengths ranging from, for instance −6 D of near-sightedness to +3.5 D of farsightedness. In the case of stepwise adjustment of the strength of the lens, the steps may range in sizes of between 0.1 D to 0.5 D. In the case of continual adjustment of the strength, the controller may be provided with markings that indicate the position of the controller that corresponds to commonly prescribed strengths. It is foreseen that the portable vision assistance assembly may be customised towards persons suffering from hypermetropia or farsightedness only, in which case the strength of the variable focus optical lens will range from approximately +0.25 to +3.5 D and the lens will include either markings or stepwise adjustments that correspond to the strengths of over the counter reading eyeglasses, such as 0.75 D, 1.5 D, 2.5 D and 3.5 D.

The adjustability of the variable focus optical lens allows many different users requiring different degrees of vision correction to use the portable vision assistance assembly when applying makeup or doing other facial grooming in front of a mirror. The adjustability of the lens also enables a person with gradually declining vision to adjust the focus of the lenses to suit his or her current level of visual impairment.

The variable focus optical lens may be provided with an attachment formation that is complementary to the attachment formation at or near an operatively free end of the body or on the lid of the cavity.

In use, the portable vision assistance assembly described herein allows a visually impaired user to have their vision corrected by looking through the vision correcting optical into the mirror to see themselves, while having their faces unobscured and both hands free to apply contact lenses, medicinal products, make-up, other cosmetics or do other facial grooming. This alleviates the normal obstruction problems associated with wearing optical spectacles while applying contact lenses, medicinal products, make-up or otherwise grooming one's face.

In addition, the portable vision assistance assembly is able to house the vision correcting optical lens and collapse into a portable unit when it is not used. First, the first attachment means is releasable such that the assembly can be released from the secondary structure such as a mirror. The vision correcting optical lens can then be detached from the second attachment formation and placed within the cavity for storage. The lid of the cavity can be closed. The base of the assembly is pivotable such that it can pivot back to a position in which it is substantially aligned with the body. If the assembly includes a further detachable plate, the detachable plate can be mounted to the exterior of the body by means of clips or the like. The portable vision assistance assembly is therefore convertible between an operative and inoperative condition, and in the inoperative condition it is more compact (collapsed) making the assembly more versatile and allowing it to be carried more easily within a handbag or the like to any location where it may be needed and can be used.

Preferably, the majority of the portable vision assistance assembly, especially the parts proximate the vision correcting optical lens, are constructed from at least a partly translucent, or even transparent material such as see-through plastic. This will even further assist a user in having his or her view unobscured.

It should be appreciated that the above embodiments are by way of example only, and that numerous changes and modifications may be made to the embodiments described without departing from the scope of the invention. For example, it should be noted that various other methods of releasably attaching the body to a flat surface of a secondary structure may be possible, such as suction cups or methods incorporating magnets.

Furthermore, the lenses may be manufactured from any suitable material, typically materials commonly found in regular optical spectacles such polycarbonate, glass, plastic, polycarbonate or the like.

The second attachment formation may be any one of a variety of connectors including hinges, clips, ball-in-socket fasteners, connectors and the like. It is further envisioned that the second attachment formation to the optical correction lens may include an arm that is extendible, allowing for the lens to be positioned a distance away from the body that the user wishes. In this manner, when the optical lens is attached to the lid of the cavity, for example, it can be spaced further downwardly from the lid so that it is further below the body thereby ensuring that the body is outside of a field of view of a user.

In another embodiment, the body is telescopically extendable such that the lens may be positioned further away from the base than the length of the body, for example approximately 15 cm to 40 cm away from the base. In addition, the base or body may include a further hinged connection to allow the angular position of the lens, in a horizontal plane, to be adjustable relative to the base. The combination of the movable connections between the vision correcting optical lens and body, and body and base, provides the assembly with the required degree of adjustability to allow the position of the lens to be adjusted relative to the base. This allows a user to position it at the required distance and position in front of the mirror to allow maximum vision enhancement and comfort. This may prevent a user from having to lean forwards too much if the mirror that they are using is placed an uncomfortable distance away from them, such as behind a basin in a bathroom.

It is furthermore envisaged that the assembly may itself include a mirror which may, for example, be secured to the body and positioned to, in use, be behind the lens. This would provide an entirely independent and portable unit which a user may use on any suitable support surface.

In addition, the portable vision assistance assembly may be provided with one or more magnifying lenses or an adjustable focus magnifying lens assembly for persons that are not visually impaired and do not need optical correction, but rather require magnification of their facial features for applying contact lenses, medicinal products, make-up or while doing other facial grooming in front of a mirror. It is envisioned that the vision correcting optical lens of the portable vision assistance assembly may be replaced by magnifying lenses or an adjustable focus magnifying lens assembly. The magnifying lenses or adjustable focus magnifying lens assembly is provided with attachment formations complementary to formations on the body.

The configuration of the assembly which allows the vision correcting optical lens to be detached from the second attachment formation is useful for when a user would like to replace the vision correcting optical lens with a lens of a different focal length in the event that the level of a user's visual impairment changes. Alternatively the lens can be replaced with a magnifying lens, as described above, or any other type of lens.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A portable vision assistance apparatus comprising a body including a first attachment formation configured to releasably attach the body to a stationary, secondary structure, in front of a mirror, the body defining a cavity configured to house a lens, the cavity having a lid that is moveable between a closed condition in which it covers an entrance to the cavity and an open condition in which the lid extends away from the entrance to provide access to the cavity and to position a second attachment formation provided on the lid for the attachment of the lens to the second attachment formation.

2. The portable vision assistance apparatus as claimed in claim 1, wherein the body includes a base, the base having a generally flat bottom surface on which the first attachment formation is provided for enabling the assembly to stand proud from a flat surface of the secondary structure.

3. The portable vision assistance apparatus as claimed in claim 2, wherein the first attachment formation is an adhesive tape configured to releasably attach to flat surfaces.

4. The portable vision assistance apparatus as claimed in claim 3, wherein the adhesive tape includes a dense array of micro fabricated synthetic setae.

5. The portable vision assistance apparatus as claimed in claim 2, wherein the body defining the cavity is elongate and the base is located at a first end of the body and the lid on an opposite end of the body relative to the base.

6. The portable vision assistance apparatus as claimed in claim 2, wherein the base is pivotally connected to the body so as to pivot about the first end of the body.

7. The portable vision assistance apparatus as claimed in claim 2, wherein the base includes a detachable plate on which the first attachment formation is provided, the plate being detachable from the base so that it can be attached to a flat surface of a secondary structure, and a base member pivotally connected to the body, the plate and base member having complementary engagement formations for securing the base member and thus the body to the plate.

8. The portable vision assistance apparatus as claimed in claim 7, wherein the detachable plate includes supporting formations on which the base member rests and which are arranged to support the base member and the body connected thereto, thereby holding the body generally horizontal when the base is attached to a vertical surface of a secondary structure.

9. The portable vision assistance apparatus as claimed in claim 1, wherein the lid is hingedly connected to the body at or near the entrance to the cavity.

10. The portable vision assistance apparatus as claimed in claim 1, further comprising the lens, wherein the lens includes at least one attachment formation complementary to the second attachment formation on the lid, the at least one complementary attachment formations-being arranged to permit attachment of the lens to the lid when the lid is in an open condition in which it extends at an angle from the entrance of the cavity.

11. The portable vision assistance apparatus as claimed in claim 10, wherein the lid is hingedly connected to an operatively lower surface of the body at the entrance so that the lid is downward depending when in the open condition, thereby permitting the lens to be attached to the lid such that it is located operatively below the lid when it is in the open condition.

12. The portable vision assistance apparatus as claimed in claim 10, wherein the cavity includes a cradle, operable to move the lens, when the lens is in the cavity, between end positions within the cavity upon actuation of the lid, and wherein in a first end position the lens is enclosed within the cavity while the lid is closed and in a second end position the lens extends at least partially outside of the entrance of the cavity towards the exterior while the lid is open.

13. The portable vision assistance apparatus as claimed in claim 1, wherein the body is adjustable relative to the base.

14. The portable vision assistance apparatus as claimed in claim 13, wherein the body is telescopically adjustable relative to the base.

15. The portable vision assistance apparatus as claimed in claim 1, further including a light source arranged to shine light in a direction away from the lens when the lens is mounted to the lid.

16. The portable vision assistance apparatus as claimed in claim 1, further comprising the lens, wherein the lens is a vision correcting optical lens.

17. The portable vision assistance apparatus as claimed in claim 16, wherein the vision correcting optical lens is a variable focus optical lens with adjustment means for varying the focal length of the lens.

18. The portable vision assistance apparatus as claimed in claim 1, further comprising the lens, wherein the lens is a magnifying lens.

\* \* \* \* \*